US009119156B2

(12) United States Patent
Green et al.

(10) Patent No.: US 9,119,156 B2
(45) Date of Patent: Aug. 25, 2015

(54) ENERGY-EFFICIENT TRANSMISSION OF CONTENT OVER A WIRELESS CONNECTION

(75) Inventors: Hagen Green, Kirkland, WA (US); Ranveer Chandra, Kirkland, WA (US); Apurv Bhartia, Austin, TX (US); Vishal Ghotge, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 13/549,178

(22) Filed: Jul. 13, 2012

(65) Prior Publication Data

US 2014/0019786 A1 Jan. 16, 2014

(51) Int. Cl.
*H04W 52/02* (2009.01)
(52) U.S. Cl.
CPC ............ *H04W 52/0258* (2013.01); *Y02B 60/50* (2013.01)
(58) Field of Classification Search
CPC .................................................. G06F 1/3203
See application file for complete search history.

(56) References Cited

U.S. PATENT DOCUMENTS

| 8,644,771 | B1 * | 2/2014 | Delker et al. ................. 455/69 |
| 2003/0027517 | A1 * | 2/2003 | Callway et al. ............. 455/3.01 |
| 2003/0041258 | A1 | 2/2003 | Wee et al. |
| 2003/0177255 | A1 | 9/2003 | Yun |
| 2005/0063351 | A1 | 3/2005 | Karaoguz et al. |
| 2006/0164328 | A1 | 7/2006 | Jaff |
| 2006/0282855 | A1 | 12/2006 | Margulis |
| 2007/0037609 | A1 * | 2/2007 | Zhang et al. ................. 455/574 |
| 2009/0079884 | A1 * | 3/2009 | Lin ............................. 348/739 |
| 2010/0110998 | A1 | 5/2010 | Erceg et al. |
| 2011/0093605 | A1 | 4/2011 | Choudhury et al. |
| 2011/0145879 | A1 | 6/2011 | Rajamani et al. |
| 2012/0011558 | A1 * | 1/2012 | Maddali et al. ............... 725/131 |
| 2012/0076011 | A1 * | 3/2012 | Gobriel et al. ................ 370/252 |
| 2012/0147268 | A1 * | 6/2012 | Hassan et al. ................ 348/552 |

FOREIGN PATENT DOCUMENTS

WO    WO 2005/067535    7/2005

OTHER PUBLICATIONS

International Search Report and Written Opinion, corresponding International Application No. PCT/US2013/050170, dated Sep. 4, 2013, 11 pages.

(Continued)

*Primary Examiner* — Kim Huynh
*Assistant Examiner* — Paul J Yen
(74) *Attorney, Agent, or Firm* — Bryan Webster; Kate Drakos; Micky Minhas

(57) ABSTRACT

Energy efficient transmission of content can be provided using a variety of techniques. In an example technique, portions of content can be transmitted from a first computing device to a second computing device for display. A wireless radio of the first computing device can be placed into a low power mode between transmissions of the portions of content. In another example technique, one or more portions of content can be decoded, displayed, encoded, and transmitted by a first computing device for mirroring on a second computing device. One or more other portions of the content can be transmitted in encoded format to the second device without being decoded and displayed by the first device. In another example technique, a wireless radio of a first device can be placed into a low power mode in between transmission of commands to a second computing device to control content.

20 Claims, 7 Drawing Sheets

(56) References Cited

OTHER PUBLICATIONS

Sinofsku, Steven, "Building a rich and extensible media platform," Building Windows 8, Published on: Jun. 8, 2012, 33 pages. Available at: http://blogs.msdn.com/b/b8/archive/2012/06/08/building-a-rich-and-extensible-media-platform.aspx.

Anastasi et al., "An Energy-efficient Protocol for Multimedia Streaming in a Mobile Environment," *International Journal of Pervasive Computing and Communications*, vol. 1, Issue 1, pp. 301-312, Mar. 2005.

Schulman et al., "Bartendr: A Practical Approach to Energy-aware Cellular Data Scheduling," *In Proceedings of the Sixteenth Annual International Conference on Mobile Computing and Networking (MobiCom'10)*, pp. 85-96, Sep. 20, 2010.

Hicks, "Energy Efficient Branch Prediction," A thesis submitted in partial fulfillment of the requirements of the University of Hertfordshire for the Degree of Doctor of Philosophy, 202 pages, Dec. 2007.

Palit et al., "Enhancing the Capability and Energy Efficiency of Smartphones Using WPAN," *IEEE 22nd International Symposium on Personal Indoor and Mobile Radio Communications (PIMRC)*, pp. 1020-1025, Sep. 11, 2011.

Gray, "Wirelessly Stream Your Phone's Display with HTC Media Link HD," Android and Me, http://androidandme.com/2012/02/smartphones-2/wirelessly-stream-your-phones-display-with-htc-media-link-hd/, 8 pages (accessed Apr. 12, 2012).

Wang et al., "On Energy Efficient Encryption for Video Streaming in Wireless Sensor Networks," *IEEE Transactions on Multimedia*, vol. 12, No. 5, pp. 417-426, Aug. 2010.

Apple, "AirPlay Broadcast Live to your HDTV and Speakers," http://www.apple.com/iphone/features/airplay.html, 3 pages (accessed Apr. 12, 2012).

Phones Review, "iPhone 4S battery life, video & mirroring overheating," http://www.phonesreview.co.uk/2011/10/17/iphone-4s-battery-life-video-and-mirroring-over-heating/, 7 pages, Oct. 17, 2011.

Wikipedia, "Wi-Fi Direct," <http://en.wikipedia.org/wiki/WiFi_Direct>, 4 pages (accessed Jun. 11, 2012).

Wikipedia, "Real Time Streaming Protocol," <http://en.wikipedia.org/wiki/Real_Time_Streaming_Protocol>, 7 pages (accessed Jun. 11, 2012).

Lynn, "Marvell Showcases Wi-Fi Display at CES 2012," <http://www.pcmag.com/article/print/292592>, 1 page, Jan. 9, 2012.

Wimberly, "First Android devices with WiFi Display will be powered by Qualcomm's Snapdragon," <http://androidandme.com/2012/01/news/first-android-devices-with-wi-fi-display-will-be powered-by-qualcomms-snapdragon/>, 3 pages, Jan. 12, 2012.

Intel, "Intel® Wireless Display," <http://download.intel.com/network/connectivity/products/prodbrf/323116.pdf>, 2 pages (accessed Jun. 11, 2012).

* cited by examiner

ENERGY-EFFICIENT TRANSMISSION OF CONTENT OVER A WIRELESS CONNECTION

BACKGROUND

Smart phones and other mobile devices are quickly replacing more traditional computers for many tasks, such as web browsing, watching video content, and playing games. In fact, the typical smart phone is already more powerful than computers of only a handful of years ago. Although smart phones can perform many of the tasks of traditional computers, smart phones still faces a number of limitations. For example, because smart phones are smaller than traditional computers and laptops, smart phones have a smaller keyboard and a smaller display.

One way to compensate for the small display on a smart phone or other mobile device is to wirelessly mirror the smart phone's display on a larger display. However, due to the nature of current wireless display technology, the smart phone has to continuously transmit information to the wireless display, which drains the battery of the smart phone quickly. For example, a Wi-Fi transmitter on a smart phone, if in use continuously, can account for one-third, or more, of the total power consumption of the smart phone.

Therefore, there exists ample opportunity for improvement in technologies related to energy efficient wireless display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for energy efficient transmission of content. For example, content (e.g., audio, video, web, presentation, and/or user interface content) can be transmitted from a first computing device to a second computing device (e.g., via a wireless connection such as a Wi-Fi connection). Between transmitting portions of the content, the first computing device can place a wireless radio (e.g., a Wi-Fi radio) of the first computing device into a low power mode (e.g., a sleep mode or an off state).

For example, a method, performed at least in part by a first computing device comprising a wireless radio (e.g., a Wi-Fi radio), can be provided for energy efficient transmission of content. The method comprises obtaining a first portion of the content, transmitting the first portion of the content to a second computing device for playback by the second computing device, placing the wireless radio into a low power mode, waking up from the low power mode, and after waking up from the low power mode, transmitting a second portion of the content to the second computing device.

As another example, a method, performed at least in part by a first computing device comprising a wireless radio (e.g., a Wi-Fi radio), can be provided for energy efficient transmission of content using adaptive switching. The method comprises processing a first portion of the content, comprising: decoding the first portion of the content, displaying the first portion of the content by the first computing device, encoding the displayed first portion of the content, and transmitting the encoded first portion of the content to a second computing device for playback by the second computing device. The method further comprises processing a second portion of the content at a switch point. Processing the second portion of the content comprises transmitting the second portion of the content to the second computing device for playback by the second computing device, where the second portion of the content is not decoded or displayed by the first computing device.

As another example, a method, performed at least in part by a first computing device comprising a wireless radio (e.g., a Wi-Fi radio), can be provided for energy efficient transmission of presentation content. The method comprises generating a plurality of slide presentation elements for a slide presentation, transmitting the plurality of slide presentation elements to a second computing device for playback by the second computing device, and placing the wireless radio into a low power mode. The method also comprises, upon detecting a presentation event: exiting the low power mode, transmitting a presentation command to the second computing device, and placing the wireless radio into the low power mode.

As another example, systems comprising processing units, memory, and wireless radios (e.g., Wi-Fi radios) can be provided for performing operations described herein. For example, a system can be provided for energy efficient transmission of content (e.g., comprising computer-readable storage media storing computer-executable instructions for causing the system to perform operations for energy efficient transmission of content).

As described herein, a variety of other features and advantages can be incorporated into the technologies as desired.

DETAILED DESCRIPTION

Example 1

Overview

Figure 1:
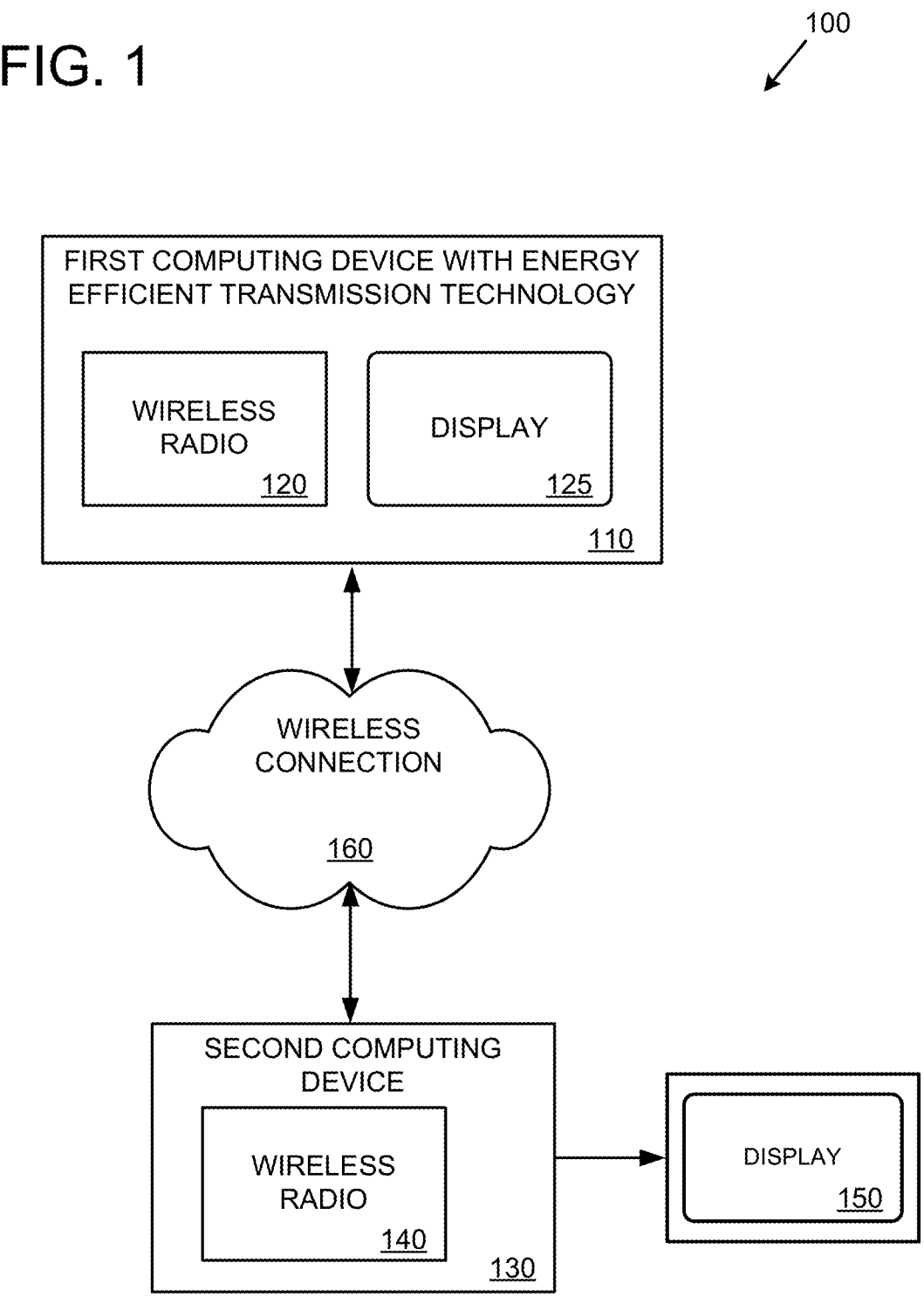
FIG. 1 is a block diagram of an exemplary environment for implementing the energy efficient technologies described herein.

The following description is directed to techniques and solutions for energy efficient transmission of content. For example, content (e.g., media content such as audio content, video content, presentation content, web page content, and/or user interface content) can be transmitted from a first computing device to a second computing device for display by the second computing device. The first computing device can be a mobile computing device (e.g., a smart phone, tablet computer, laptop computer, or other mobile device with limited battery power and a limited screen size). The second computing device can be a device with a larger screen. For example, the second computing device can be a device associated with a display or television (e.g., an external device, attached device, or built-in to the display or television). The second computing device can wirelessly receive (e.g., via a Wi-Fi radio of the second computing device), decode, and play back (on the associated display or television) the content received from the first computing device.

The energy efficient transmission (e.g., streaming) technologies described herein can be implemented by any of the computing devices described herein. For example, a first computing device can place its wireless radio (e.g., Wi-Fi radio) into a low power mode (e.g., a sleep mode, low power state, off state, etc.) in order to conserve energy (e.g., to conserve battery power of a smart phone device). The low power mode can be used in various situations where content is being transmitted. In addition to, or instead of, the wireless radio, other components of the first computing device (e.g., processing units) can be placed into a low power mode (e.g., a sleep mode, low power state, off state, etc.).

In a first example situation, predictable static (e.g., a music or video file) or dynamic (e.g., a presentation or user interface transition) content is being wirelessly transmitted from a first computing device to a second computing device. Static content refers to content (e.g., media content) that is pre-defined or known ahead-of-time. Examples of static content include an audio file (e.g., in MP3 format), a video clip, a movie file, and an image or a collection of images. Static content is predictable and can therefore be transmitted in advance (e.g., divided into portions or segments and transmitted or streamed for playback). Dynamic content refers to content that is dynamic in nature but that also has a limited and predictable number of elements. Examples of predictable dynamic content include a presentation (e.g., where the presentation comprises a known number of static images and dynamic elements), a web page or a collection of web pages (e.g., where the web pages are known and a user can dynamically navigate between them), and a user interface (e.g., where the user interface elements are known and a user can dynamically interact with them). Dynamic content can also be predictable, and can therefore be transmitted in advance (e.g., one or more web pages or user interface elements can be transmitted in advance and interaction events can be transmitted separately at a later time).

The static and/or dynamic content can be transmitted from the first computing device to the second computing device in advance (e.g., the entire content, or chunks or segments of the content). The first computing device can then place its wireless radio into a low power mode to conserve energy while the second computing device is playing or displaying the content (e.g., the entire content or a chunk/segment of the content). The first computing device can wake and send additional content when needed (e.g., the next chunk or segment of the content or new content). The first computing device can also send instructions to the second computing device (e.g., to begin playing specific content or a specific segment of content, to stop playing, to pause, to scroll a window or web page, to transition to a new slide or web page, to play an animation, etc.).

In some implementations, the first and second computing devices can communicate via Wi-Fi Direct™ (Wi-Fi Direct is a certification mark of the Wi-Fi Alliance). In other implementations, a different communication technology can be used (e.g., communication via Bluetooth® or another wireless communication technology). In some implementations, the first and second computing devices can transmit/receive content via Wi-Fi Display (Wi-Fi Display is a specification published by the Wi-Fi Alliance). In other implementations, a different technology can be used to transmit/receive content (e.g., a different media streaming technology). In some implementations, the first and second computing devices can exchange commands (e.g., play, pause, stop, etc.) using the Real Time Streaming Protocol (RTSP). In other implementations, a different technology can be used to communicate commands between computing devices.

In a second example situation, adaptive switching can be used to conserve energy. Typically, with a mirrored display between two wireless devices (e.g., a smart phone and a television) both devices will display the same content (e.g., both devices will display a movie or a video game). Because the same content is being displayed, the first device (e.g., the smart phone) will decode the content (e.g., decode a movie file), display the content on the first device's display (e.g., the smart phone's smaller display), encode the displayed content, and transmit the encoded displayed content to the second computing device for display (e.g., playback on the television's larger display). Typically, this process would be performed continuously (e.g., for each video frame of a movie) thus draining the battery of the first wireless device (e.g., due to continuous use of the wireless radio).

In order to provide more energy efficient transmission of content, adaptive switching can be used to send some of the content to the second computing device without having to decode/display/encode the content on the first computing device. For example, the first computing device can decode, display, encode (e.g., re-encoding), and transmit a first portion (e.g., a first time segment) of the content to the second computing device. At a switch location, the first computing device can switch to sending a second portion (e.g., a second time segment) of the content to the second computing device without decoding, displaying, and encoding the content on the first computing device. For example, the first computing device can merely transmit the second portion without any additional processing (e.g., in its original format, such as an H.264 encoded video format) or with some processing (e.g., with transcoding, but still without displaying on the first computing device).

The first computing device can save energy using adaptive switching. For example, the first computing device can stop displaying the content after the first portion. The first computing device can also place a wireless radio (e.g., Wi-Fi radio) of the first computing device into a low power mode between transmitting additional portions of the content (e.g., between transmitting the second, and subsequent, portions of the content). Even if the first computing device is no longer decoding and displaying the content after the first portion, the first computing device can continue to display user interface controls related to the content (e.g., play, pause, stop, etc.). The first computing device can also dim its display or turn off its display after the first portion has been displayed.

The switch location can be determined based on various criteria, For example, the switch location can be determined based on a pre-defined amount of time or based on inactivity. The switch location can also be manually selected by a user. For example, a movie file can be decoded and displayed at the first computing device and the displayed content can be re-encoded and transmitted to a second computing device for display (e.g., mirrored display). After a period of inactivity (e.g., if a user has not interacted with the first computing device for a number of seconds or minutes), the first computing device can switch to transmitting the movie file directly to the second computing device without decoding and displaying locally. This can allow the first computing device to dim or turn off the local display and/or place the wireless radio into a low power mode (e.g., between transmitting subsequent portions of the movie file). Upon subsequent interaction (e.g., user activation of the first computing device), the first computing device can switch back to a mirrored display mode (e.g., decoding and displaying the content locally as well as transmitting re-encoded displayed content to the second computing device).

In a third example situation, content with a pre-defined number of elements can be generated and sent to a second computing device and controlled from the first computing device. The content can comprise elements of a web page or multiple web pages, elements of a user interface (e.g., user interface windows, lists, menus, static background images, etc.), presentation elements, a collection image elements (e.g., pictures, animated transitions, audio clips, etc.), and other types of elements.

For example, a plurality of slide presentation elements can be generated for a slide presentation (e.g., static images, text animations, graphic animations, transitions, etc.). The slide presentation elements can be transmitted from a first computing device (e.g., a smart phone) to a second computing device (e.g., a computing device with a larger display and/or projector). A wireless radio of the first computing device can then be placed into a low power mode. When interaction with the presentation occurs (e.g., when a user wants to transition to the next slide or activate a text or graphic animation), the first computing device can wake from the low power mode and transmit a command to the second computing device (e.g., a presentation command instructing the second computing device to transition to the next slide, activate an animation, etc.). The first computing device can then place its wireless radio into the low power mode until the next interaction. In this manner, a user can use the first computing device to deliver and control a presentation while conserving battery power.

The example situations discussed above can be used separately or in combination.

Example 2

Environment for Energy Efficient Transmission of Content

FIG. 1 is a block diagram depicting an exemplary environment 100 for implementing the energy efficient transmission technologies described herein. The example environment 100 includes a first computing device 110 and a second computing device 130. For example, the first computing device 110 can be a battery-powered mobile device, such as a smart phone, tablet, or laptop. The first computing device implements one or more of the energy efficient transmission technologies described herein, such as adaptive switching and/or low power modes. The second computing device 130 can be a device connected to a display 150, such as a high-definition television. Alternatively, the second computing device 130 can be integrated with the display 150.

The first computing device 110 comprises a wireless radio 120 (e.g., a Wi-Fi radio). The second computing device 130 also comprises a wireless radio 140 (e.g., a Wi-Fi radio). The first computing device 110 and the second computing device 130 communicate via a wireless connection 160 established by their respective wireless radios (120 and 140). For example, the first computing device 110 and the second computing device 130 can be connected directly (e.g., a peer-to-peer or ad-hoc wireless connection) or through a connecting network (e.g., a wireless router or access point).

The first computing device 110 and the second computing device 130 can support various wireless protocols and/or standards. For example, the first computing device 110 and the second computing device 130 can support Wi-Fi Direct and/or Wi-Fi Display. The computing devices 110 and 130 can support other networking protocols, such as RTSP.

The environment 100 can support the various energy efficient transmission technologies described herein. For example, the first computing device 110 can place its wireless radio 120 into a low power mode between transmission of portions of content from the first computing device 110 to the second computing device 130.

The first computing device 110 can perform adaptive switching. For example, the first computing device 110 can decode, locally display (on the display 125 of the first computing device 110), encode, and transmit a first portion of content to the second computing device 130 for mirrored display by the second computing device 130 on its associated display 150 (e.g., a remote display). The first computing device 110 can then switch to direct transmission of encoded second (and subsequent) portions of the content to the second computing device 130 for decoding and display by the second computing device 130 on its associated display 150. After switching, the first computing device 110 can dim or turn off its local display 125 and/or place its wireless radio 120 (and/or other components of the first computing device 110) into a low power mode (e.g., between transmitting chunks or segments of content).

The first computing device 110 can also generate content elements (e.g., slide presentation elements, or elements for other types of content) and transmit some or all of them to the second computing device 130. The first computing device 110 can place its wireless radio 120 into a low power mode until subsequent commands need to be sent to the second computing device 130. For example, the first computing device 110 can wake its wireless radio 120 to transmit a command to the second computing device 130 to transition to the next slide, perform an animation, pause display, stop display, or perform another command.

Example 3

Energy Efficient Transmission of Content

In any of the examples herein, portions of content (e.g., segments of a video or audio file, web page content, slide presentation content, etc.) can be transmitted in an energy efficient manner. For example, a wireless radio can be placed into a low power mode between transmitting portions of the content.

Figure 2:
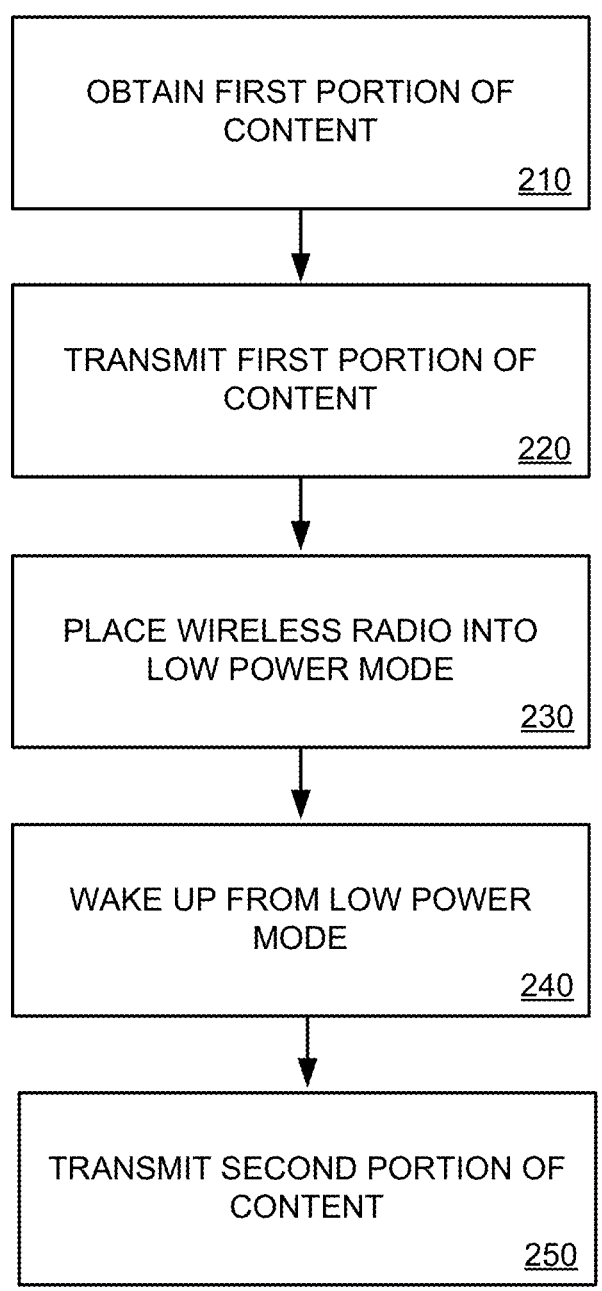
FIG. 2 is a flowchart showing an exemplary method for energy efficient transmission of content.

FIG. 2 is a flowchart of an example method 200 for energy efficient transmission of content. The method 200 can be performed, at least in part, by a first computing device comprising a wireless radio (e.g., a Wi-Fi radio). At 210, a first portion of the content is obtained. For example, the first portion of the content can be a segment of the content of a specific size or duration (e.g., a 5 or 10 second portion of the content).

At 220, the first portion of the content is transmitted to a second computing device for playback (e.g., display) by the second computing device. For example, the second computing device can be associated with a display (e.g., the second computing device can be an external device or built-in to a television). The second computing device can process the first portion of the content (e.g., perform decoding operations) and play back the processed content on an associated display.

At 230 the wireless radio (e.g., Wi-Fi radio) of the first computing device is placed into a low power mode. The low power mode can be any mode that conserves power (e.g., a reduced power mode, a sleep mode, a deep sleep mode, a mode that turns the wireless radio off, etc.). In addition to the wireless radio, other components of the first computing device can be placed into a low power mode (e.g., a display of the first computing device can be dimmed or turned off or a processing unit of the first computing device can be placed into a low power mode).

At 240, the wireless radio of the first computing device is woken from the low power mode. In addition to the wireless radio, other components of the first computing device can wake from a low power mode. The wireless radio can be woken before playback of the first portion of the content has finished on the second computing device.

At 250, a second portion of the content is transmitted to the second computing device for playback by the second computing device. After transmitting the second portion of the content 250, the first computing device can place its wireless radio back into the low power mode. In this manner, any number of additional portions of the content can be transmitted to the second computing device with the wireless radio of the first computing device being placed into the low power mode in between the transmissions (e.g., during idle time when the wireless radio of the first computing device is not actively transmitting).

The amount of content to transmit for a given portion of content can be determined, for example, based on a usage scenario of the first computing device. For example, if a user of the first computing device is watching a movie (e.g., an audio-video usage scenario), then a relatively long duration of the content can be selected for each portion (e.g., the user may be likely to watch for a long time, such as for the entire movie). Selecting a long duration (e.g., a number of minutes) can be efficient because the wireless radio of the computing device (alone or in combination with other components of the computing device) can be placed into a low power mode for the duration of the portion until the device needs to wake to transmit the next portion.

As another example, if the user is browsing video clips (e.g., a video clip browsing scenario), then a relatively short duration of the content can be sent (e.g., 30 seconds). Selection of a short duration (e.g., a number of seconds, such as 30 seconds) can be efficient when viewing video clips because the clips may be short in duration and a user may switch between viewing different clips frequently.

As another example, the user may be browsing web pages (e.g., a web browsing scenario) and the content may comprise web page content (e.g., web page elements, web pages, or multiple web pages). For example, in this scenario the first computing device could transmit a first web page (the first portion) and then enter the low power mode until the second web page (the second portion) needs to be transmitted (e.g., upon the user navigating to the second web page). As another example, in this scenario the first computing device could transmit a first set of web pages (the first portion) and then enter the low power mode until the next set of web pages (the second portion) needs to be transmitted (e.g., upon the user navigating among the first set of web pages and then moving on to the second set).

As another example, the user may be delivering a presentation (e.g., a slide presentation) and the content may comprise slide presentation elements. For example, in this scenario, the first computing device could transmit a first slide and its associated elements (e.g., animation elements) and then enter the low power mode until the next slide and its associated elements needs to be transmitted (e.g., upon the user transitioning to the next slide).

Example 4

Adaptive Switching for Energy Efficient Transmission of Content

In any of the examples herein, adaptive switching can be performed to enable energy efficient transmission of content. For example, one or more portions of content (e.g., one or more segments of a video and/or audio file) can be transmitted in a mirrored mode with local decoding and display by a first computing device (e.g., by a smart phone or other mobile device) as well as encoding of the displayed content, wireless transmission to a second computing device (e.g., a television) of the encoded displayed content, and simultaneous (or near simultaneous) display by the second computing device. One or more other portions of the content (e.g., one or more other segments of the video and/or audio file) can be transmitted to the second device for decoding and display without decoding and display by the first computing device. The first computing device can enter a low power mode when the other portions of the content have been transmitted (e.g., between transmitting the other portions, or between transmitting segments of the other portions).

Figure 3:
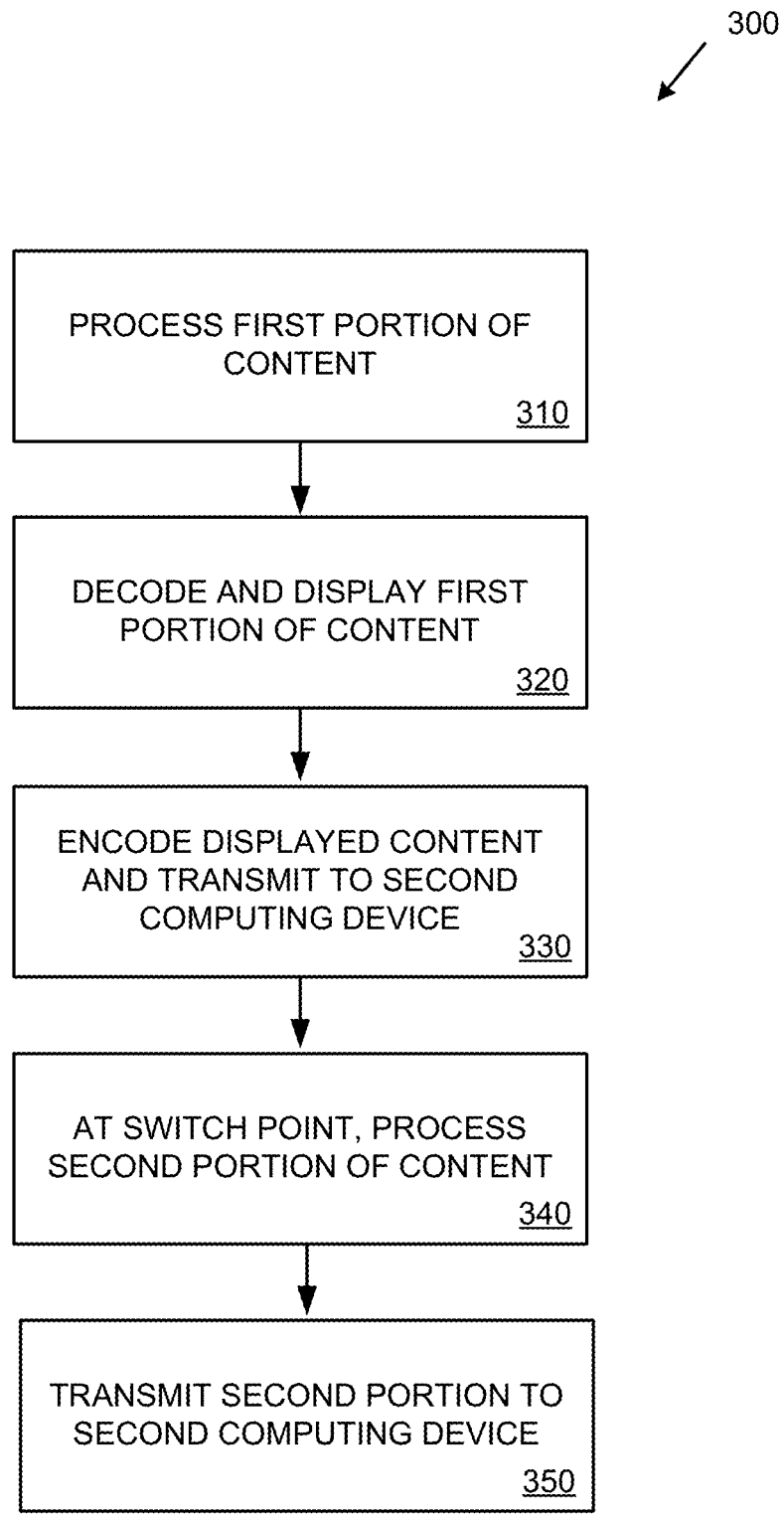
FIG. 3 is a flowchart showing an exemplary method for energy efficient transmission of content using adaptive switching.

FIG. 3 is a flowchart of an example method 300 for energy efficient transmission of content using adaptive switching. The method 300 can be performed, at least in part, by a first computing device comprising a wireless radio (e.g., a Wi-Fi radio). At 310, a first portion of the content is processed. Processing the first portion of the content comprises decoding and displaying the first portion of the content 320 by the first computing device (e.g., on a local display of the first computing device). Processing the first portion of the content also comprises encoding the displayed content (e.g., re-encoding the displayed content) and transmitting the encoded displayed content 330 to a second computing device for playback by the second computing device. For example, the second computing device can be associated with a high-definition display, such as a high-definition television.

At a switch location, a second portion of the content is processed 340. Processing the second portion of the content comprises transmitting the second portion of the content to the second computing device 350. The second portion of the content is not displayed by the first computing device, and may not have to be decoded (e.g., the encoded content can be transmitted directly to the second computing device for decoding and display, or the first computing device can perform some coding operations, such as transcoding, to place the content in a format usable by the second computing device). Therefore, the first computing device can dim or turn off its display, or use its display for another purpose. The first computing device can also place its wireless radio (e.g., Wi-Fi radio) into a low power mode after transmitting the second portion of the content, and in between transmitting subsequent portions of the content.

In some implementations, the second portion of the content is transmitted in a plurality of segments. A wireless radio (e.g., a Wi-Fi radio) of the first computing device can be placed into a low power mode between transmitting the segments of the second portion of the content.

In a specific implementation, mirrored display (e.g., where the first computing device decodes and displays the content, and encodes the displayed content and transmits it to the second computing device for simultaneous, or near simultaneous, display) is performed until a first inactivity period occurs. When the first inactivity period occurs (e.g., a number of seconds or minutes, such as 30 seconds), the first computing device stops decoding and displaying the content (e.g., at the determined switch point) and begins transmitting encoded content directly to the second computing device for decoding and display. After this first inactivity period, the first computing device still displays controls (e.g., play, pause, etc.) on its local display. After a second inactivity period occurs (e.g., a number of seconds or minutes after the first inactivity period), the first computing device dims or turns off its local display. Instead of, or in addition to, inactivity timers, a user can manually activate the adaptive switching.

Example 5

Energy Efficient Transmission of Presentation Content

In any of the examples herein, energy efficient transmission of content with a pre-defined number of elements (e.g., presentation content) can be performed. For example, a plurality of slide presentation elements can be generated for a slide presentation (e.g., static images, dynamic elements such as text animations, graphic animations, and transitions, audio elements, etc.). The slide presentation elements can be transmitted from a first computing device (e.g., a smart phone) to a second computing device (e.g., a computing device with a larger display and/or projector). A wireless radio (e.g., a Wi-Fi radio) of the first computing device can then be placed into a low power mode. In addition to, or instead of, the wireless radio, other components of the computing device (e.g., processing units) can be placed into a low power mode. When interaction with the presentation occurs (e.g., when a user wants to transition to the next slide or activate a text or graphic animation), the first computing device can wake from the low power mode and transmit a command, and/or additional presentation elements, to the second computing device (e.g., a presentation command instructing the second computing device to transition to the next slide, activate an animation, etc.).

Figure 4:
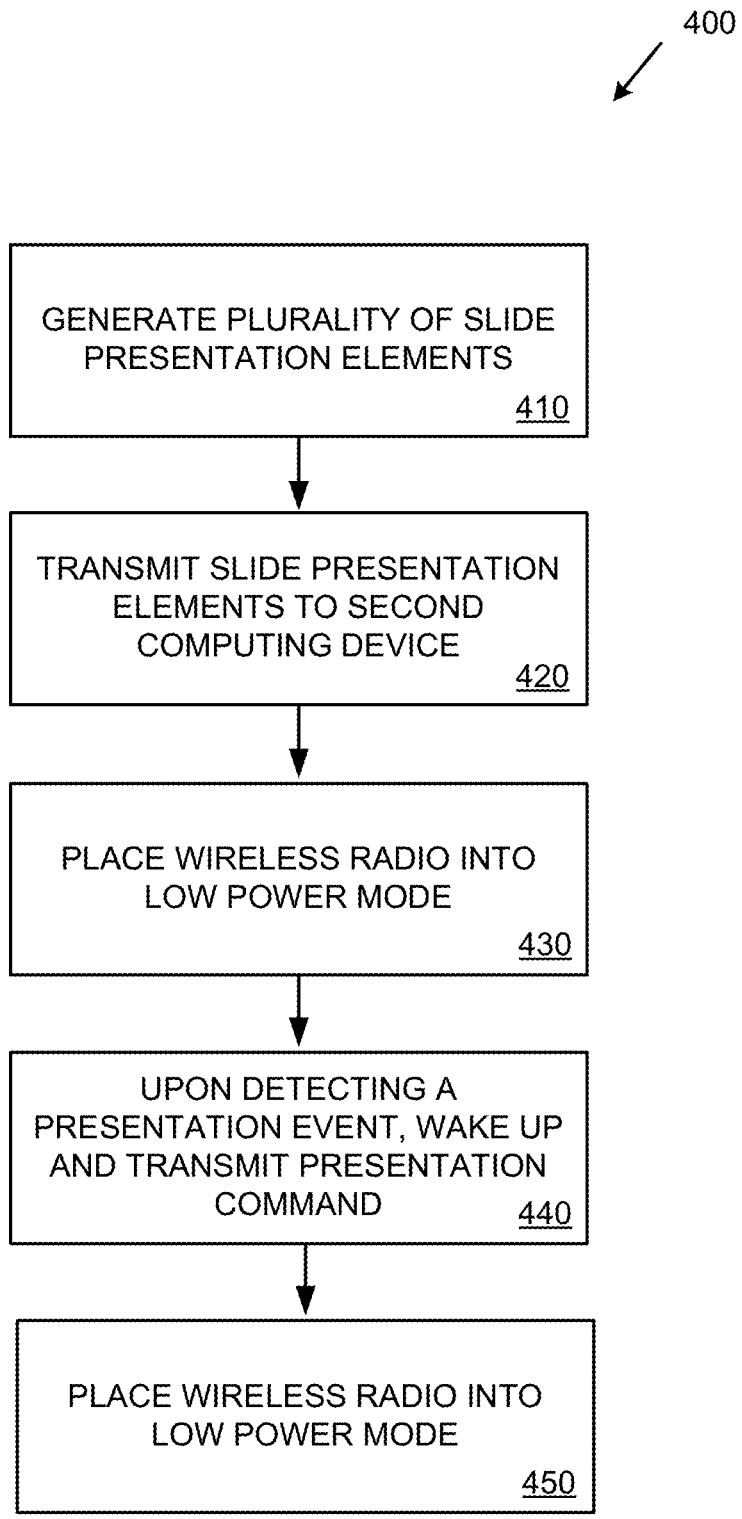
FIG. 4 is a flowchart showing an exemplary method for energy efficient transmission of presentation content.

FIG. 4 is a flowchart of an example method 400 for energy efficient transmission of presentation content. The method 400 can be performed, at least in part, by a first computing device comprising a wireless radio (e.g., a Wi-Fi radio). At 410, a plurality of slide presentation elements are generated. For example, the slide presentation elements can include static images, text animations, graphic animations, transitions, audio elements, etc. The generated slide presentation elements can cover an entire presentation or a portion of a presentation.

At 420, the generated slide presentation elements are transmitted from the first computing device to a second computing device. Depending on implementation details, some or all of the slide presentation elements can be transmitted. For example, all of the slide presentation elements for a presentation can be generated and transmitted at once, before a presentation is to begin.

At 430, a wireless radio (e.g., a Wi-Fi radio) of the first computing device is placed into a low power mode. For example, all of the slide presentation elements for a presentation can be transmitted in advance of the presentation and the wireless radio can be placed into the low power mode.

At 440, upon detecting a presentation event, the wireless radio of the first computing device wakes up and a presentation command is transmitted to the second computing device. The presentation event can include a transition event, a dynamic element event (an animated text or graphics event), an audio event, or another type of event where the first computing device needs to wake up and send a command to the second computing device to control the presentation. For example, the first computing device can receive input from a user indicating that a transition to the next slide should be performed. In response, the first computing device can wake from the low power mode and transmit a presentation command to transition to the next slide to the second computing device. The second computing device can receive the presentation command and perform the requested action (e.g., switch from displaying a first slide to displaying a second slide from the plurality of slide presentation elements received by the second computing device).

At 450, the wireless radio of the first computing device is placed into the low power mode. For example, the wireless radio can be placed into the low power mode until the next presentation event is detected. In this manner, the first computing device can remain in a low power mode unless the first computing device needs to wake and send a command to the second computing device to control the presentation.

Example 6

Computing Systems

Figure 5:
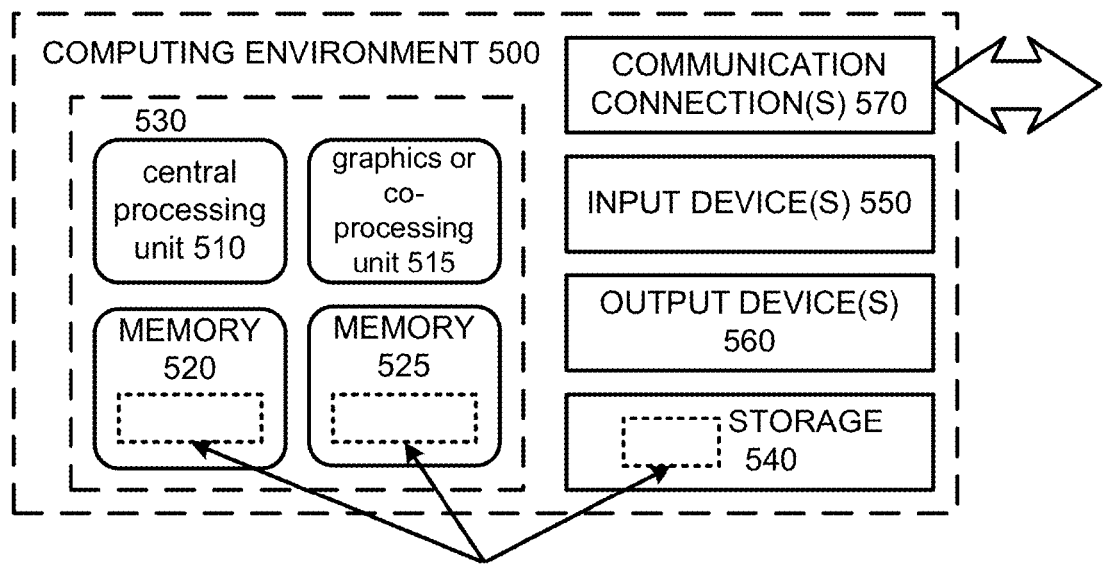
FIG. 5 is a diagram of an exemplary computing system in which some described embodiments can be implemented.

FIG. 5 depicts a generalized example of a suitable computing system 500 in which the described innovations may be implemented. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 7

Mobile Devices

Figure 6:
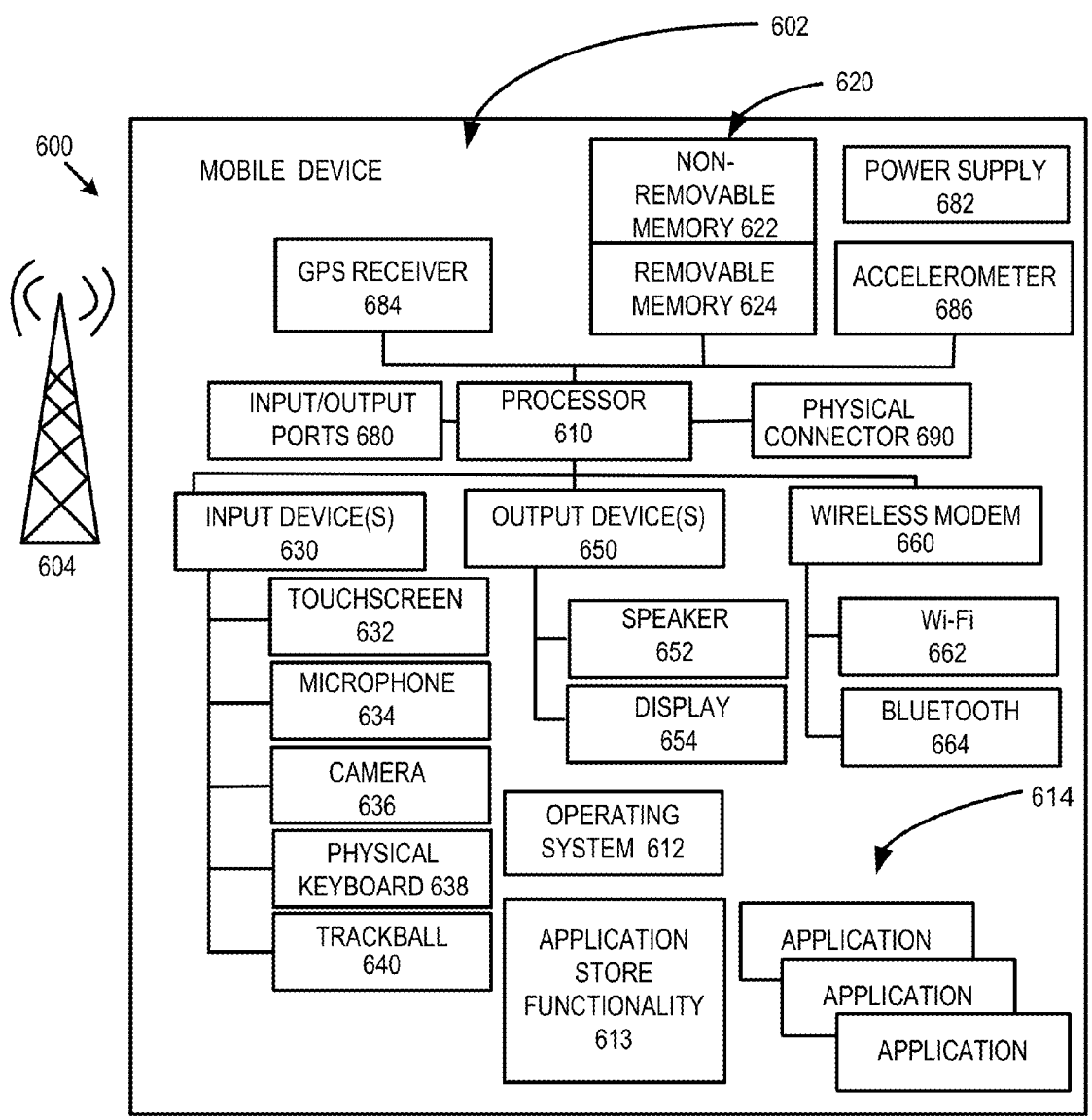
FIG. 6 is an exemplary mobile device that can be used in conjunction with the technologies described herein.
Figure 7:
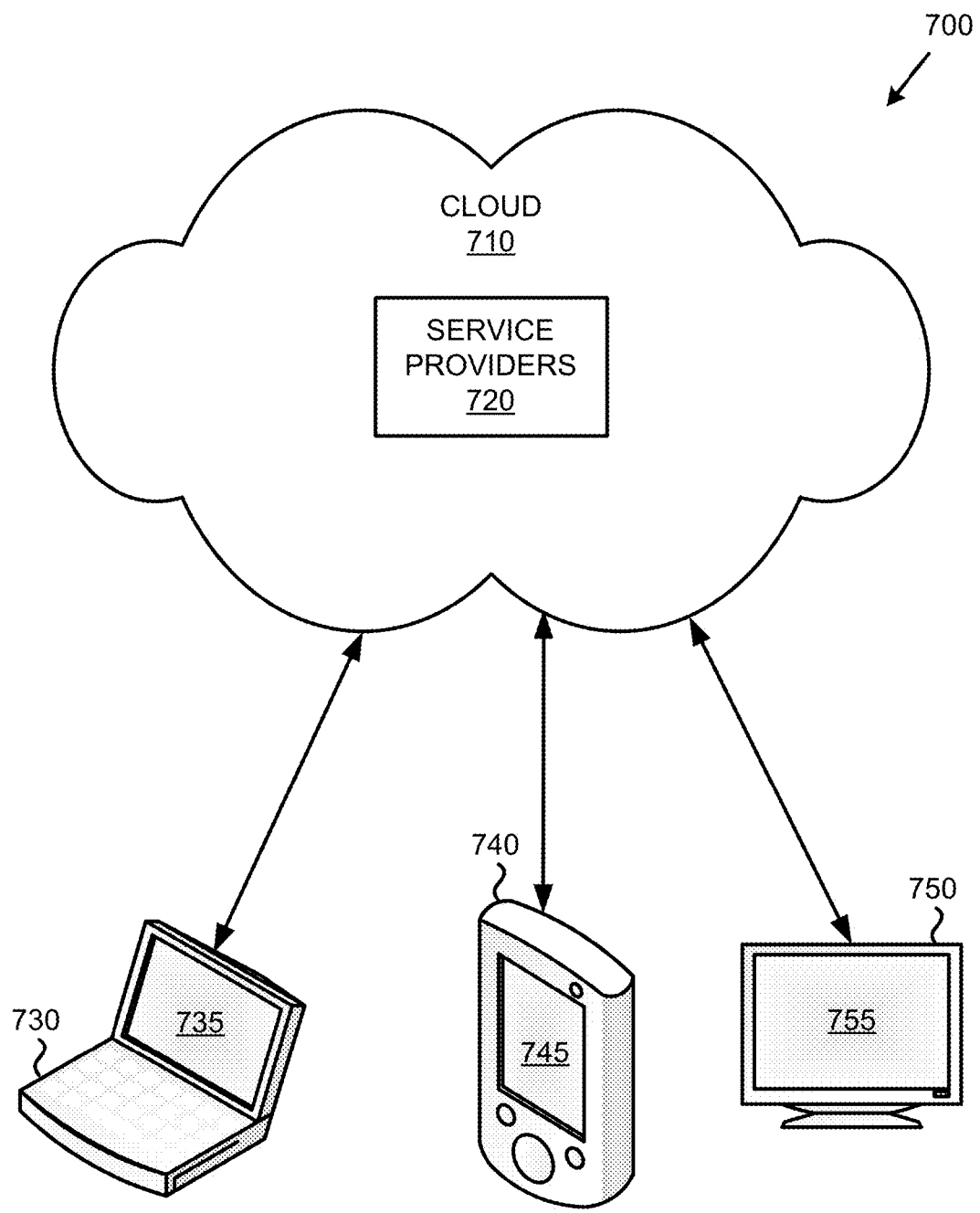
FIG. 7 is an exemplary cloud-support environment that can be used in conjunction with the technologies described herein.

FIG. 6 is a system diagram depicting an exemplary mobile device 600 including a variety of optional hardware and software components, shown generally at 602. Any components 602 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 604, such as a cellular, satellite, or other network.

The illustrated mobile device 600 can include a controller or processor 610 (e.g., signal processor, microprocessor, ASIC, or other control and processing logic circuitry) for performing such tasks as signal coding, data processing, input/output processing, power control, and/or other functions. An operating system 612 can control the allocation and usage of the components 602 and support for one or more application programs 614. The application programs can include common mobile computing applications (e.g., email applications, calendars, contact managers, web browsers, messaging applications), or any other computing application. Functionality 613 for accessing an application store can also be used for acquiring and updating applications 614.

The illustrated mobile device 600 can include memory 620. Memory 620 can include non-removable memory 622 and/or removable memory 624. The non-removable memory 622 can include RAM, ROM, flash memory, a hard disk, or other well-known memory storage technologies. The removable memory 624 can include flash memory or a Subscriber Identity Module (SIM) card, which is well known in GSM communication systems, or other well-known memory storage technologies, such as "smart cards." The memory 620 can be used for storing data and/or code for running the operating system 612 and the applications 614. Example data can include web pages, text, images, sound files, video data, or other data sets to be sent to and/or received from one or more network servers or other devices via one or more wired or wireless networks. The memory 620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 600 can support one or more input devices 630, such as a touch screen 632, microphone 634, camera 636, physical keyboard 638 and/or trackball 640 and one or more output devices 650, such as a speaker 652 and a display 654. Other possible output devices (not shown) can include piezoelectric or other haptic output devices. Some devices can serve more than one input/output function. For example, touchscreen 632 and display 654 can be combined in a single input/output device.

The input devices 630 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 612 or applications 614 can comprise speech-recognition software as part of a voice user interface that allows a user to operate the device 600 via voice commands. Further, the device 600 can comprise input devices and software that allows for user interaction via a user's spatial gestures, such as detecting and interpreting gestures to provide input to a gaming application.

A wireless modem 660 can be coupled to an antenna (not shown) and can support two-way communications between the processor 610 and external devices, as is well understood in the art. The modem 660 is shown generically and can include a cellular modem for communicating with the mobile communication network 604 and/or other radio-based modems (e.g., Bluetooth® 664 or Wi-Fi 662). The wireless modem 660 is typically configured for communication with one or more cellular networks, such as a GSM network for data and voice communications within a single cellular network, between cellular networks, or between the mobile device and a public switched telephone network (PSTN).

The mobile device can further include at least one input/output port 680, a power supply 682, a satellite navigation system receiver 684, such as a Global Positioning System (GPS) receiver, an accelerometer 686, and/or a physical connector 690, which can be a USB port, IEEE 1394 (FireWire) port, and/or RS-232 port. The illustrated components 602 are not required or all-inclusive, as any components can deleted and other components can be added.

Example 8

Cloud-Supported Environment

In example environment 700, the cloud 710 provides services for connected devices 730, 740, 750 with a variety of screen capabilities. Connected device 730 represents a device with a computer screen 735 (e.g., a mid-size screen). For example, connected device 730 could be a personal computer such as desktop computer, laptop, notebook, netbook, or the like. Connected device 740 represents a device with a mobile device screen 745 (e.g., a small size screen). For example, connected device 740 could be a mobile phone, smart phone, personal digital assistant, tablet computer, and the like. Connected device 750 represents a device with a large screen 755. For example, connected device 750 could be a television screen (e.g., a smart television) or another device connected to a television (e.g., a set-top box or gaming console) or the like. One or more of the connected devices 730, 740, 750 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 700. For example, the cloud 710 can provide services for one or more computers (e.g., server computers) without displays.

Services can be provided by the cloud 710 through service providers 720, or through other providers of online services (not depicted). For example, cloud services can be customized to the screen size, display capability, and/or touch screen capability of a particular connected device (e.g., connected devices 730, 740, 750).

In example environment 700, the cloud 710 provides the technologies and solutions described herein to the various connected devices 730, 740, 750 using, at least in part, the service providers 720. For example, the service providers 720 can provide a centralized solution for various cloud-based services. The service providers 720 can manage service subscriptions for users and/or devices (e.g., for the connected devices 730, 740, 750 and/or their respective users).

Example 9

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (i.e., non-transitory computer-readable media, such as one or more optical media discs such as DVD or CD, volatile memory components (such as DRAM or SRAM), or nonvolatile memory components (such as flash memory or hard drives)). By way of example and with reference to FIG. 5, computer-readable storage media include memory 520 and 525, and storage 540. By way of example and with reference to FIG. 6, computer-readable storage media include memory and storage 620, 622, and 624. As should be readily understood, the term computer-readable storage media does not include communication connections (e.g., 570, 660, 662, and 664), carrier waves, or any other signals.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method, implemented at least in part by a first computing device comprising a wireless radio and a processing unit, for energy efficient transmission of content, the method comprising:
by the first computing device:
obtaining a first portion of the content, wherein the content comprises at least one of audio content, video content, presentation content, web page content, and user interface content;
selecting a duration for the first portion of the content, wherein the duration is selected based at least in part upon a usage scenario related to the content;
processing the first portion of the content, comprising:
decoding the first portion of the content;
displaying the first portion of the content by the first computing device; and
encoding the displayed first portion of the content;
transmitting the encoded first portion of the content from the first computing device to a second computing device for playback by the second computing device in a mirrored mode;
placing the wireless radio into a low power mode;
waking up the wireless radio from the low power mode, wherein a time between the placing and the waking is determined based on the duration for the first portion of the content; and
at a switch location, after waking up the wireless radio from the low power mode, transmitting a second portion of the content to the second computing device for playback by the second computing device, wherein the second portion of the content is not decoded and not displayed by the first computing device.

2. The method of claim 1, further comprising:
placing the processing unit into a low power mode; and
waking up the processing unit from the low power mode;
wherein transmitting the second portion of the content to the second computing device occurs after waking up the processing unit from the low power mode.

3. The method of claim 1 wherein the usage scenario is one of:
an audio-video usage scenario that is selected when the content is static audio and/or video content, wherein the duration for the audio-video usage scenario is a relatively long duration; and
a video clip browsing usage scenario that is selected when the content is video clips, wherein the duration of the video clip browsing usage scenario is a relatively short duration.

4. The method of claim 1 wherein the content comprises dynamic image content, and wherein the usage scenario is a presentation usage scenario.

5. The method of claim 1 wherein the first computing device wakes up the wireless radio from the low power mode before playback of the first portion of the content by the second computing device has completed.

6. The method of claim 1 wherein the wireless radio is a Wi-Fi radio, wherein the first computing device and the second computing device communicate using a direct connection via Wi-Fi.

7. The method of claim 1 wherein the first computing device is a mobile computing device, and wherein the second computing device is associated with a high-definition display.

8. The method of claim 1, further comprising:
transmitting a command to the second computing device, wherein the command instructs the second computing device to perform an action for the first portion of the content, wherein the action is one of a play action and a pause action.

9. The method of claim 1 further comprising: determining the switch location based at least in part upon a period of inactivity associated with the first computing device.

10. The method of claim 1 wherein the second portion of the content is transmitted in a plurality of segments, and wherein the transmitting the second portion of the content comprises:
placing the wireless radio of the first computing device into the low power mode between transmitting segments of the second portion of the content.

11. The method of claim 1 wherein the first computing device is a mobile computing device comprising a local display, and wherein the second computing device is associated with a high-definition display.

12. A first computing device, comprising:
one or more processing units;
memory;
a wireless radio; and
one or more computer-readable storage media storing computer-executable instructions for causing the first computing device to perform operations for energy efficient transmission of content, comprising:
obtaining a first portion of the content, wherein the content comprises at least one of audio content, video content, presentation content, web page content, and user interface content;
selecting a duration for the first portion of the content, wherein the duration is selected based at least in part upon a usage scenario related to the content;
processing the first portion of the content, comprising:
decoding the first portion of the content;
displaying the first portion of the content by the first computing device; and
encoding the displayed first portion of the content;
transmitting the encoded first portion of the content from the first computing device to a second computing device for playback by the second computing device in a mirrored mode;
placing the wireless radio into a low power mode;
waking up the wireless radio from the low power mode, wherein a time between the placing and the waking is determined based on the duration for the first portion of the content; and at a switch location, after waking up the wireless radio from the low power mode, transmitting a second portion of the content to the second computing device for playback by the second computing device, wherein the second portion of the content is not decoded and not displayed by the first computing device.

13. The computing device of claim 12, the operations further comprising:
placing the processing unit into a low power mode; and
waking up the processing unit from the low power mode;
wherein transmitting the second portion of the content to the second computing device occurs after waking up the processing unit from the low power mode.

14. The computing device of claim 12 wherein the usage scenario is one of:
an audio-video usage scenario that is selected when the content is static audio and/or video content, wherein the duration for the audio-video usage scenario is a relatively long duration; and
a video clip browsing usage scenario that is selected when the content is video clips, wherein the duration of the video clip browsing usage scenario is a relatively short duration.

15. The computing device of claim 12 wherein the content comprises dynamic image content, and wherein the usage scenario is a presentation usage scenario.

16. The computing device of claim 12 wherein the first computing device wakes up the wireless radio from the low power mode before playback of the first portion of the content by the second computing device has completed.

17. The computing device of claim 12 wherein the wireless radio is a Wi-Fi radio, wherein the first computing device and the second computing device communicate using a direct connection via Wi-Fi.

18. The computing device of claim 12 wherein the first computing device is a mobile computing device, and wherein the second computing device is associated with a high-definition display.

19. The computing device of claim 12, the operations further comprising:
transmitting a command to the second computing device, wherein the command instructs the second computing device to perform an action for the first portion of the content, wherein the action is one of a play action and a pause action.

20. One or more computer-readable storage media storing computer-executable instructions for causing a first computing device comprising a wireless radio and a processing unit to perform operations for energy efficient transmission of content, comprising:
obtaining a first portion of the content, wherein the content comprises at least one of audio content, video content, presentation content, web page content, and user interface content;
selecting a duration for the first portion of the content, wherein the duration is selected based at least in part upon a usage scenario related to the content;
processing the first portion of the content, comprising:
decoding the first portion of the content;
displaying the first portion of the content by the first computing device; and
encoding the displayed first portion of the content;
transmitting the encoded first portion of the content from the first computing device to a second computing device for playback by the second computing device in a mirrored mode;
placing the wireless radio into a low power mode;
waking up the wireless radio from the low power mode, wherein a time between the placing and the waking is determined based on the duration for the first portion of the content; and
at a switch location, after waking up the wireless radio from the low power mode, transmitting a second portion of the content to the second computing device for playback by the second computing device, wherein the second portion of the content is not decoded and not displayed by the first computing device.

* * * * *